(12) United States Patent
Wu (10) Patent No.: US 8,271,967 B2
(45) Date of Patent: Sep. 18, 2012

(54) MFP SOFTWARE UPDATE USING WEB SERVICE

(75) Inventor: Yuwen Wu, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1136 days.

(21) Appl. No.: 12/136,045

(22) Filed: Jun. 9, 2008

(65) Prior Publication Data

US 2009/0307678 A1 Dec. 10, 2009

(51) Int. Cl.
 G06F 13/00 (2006.01)
 G09F 9/44 (2006.01)
(52) U.S. Cl. .......................... 717/168; 719/318
(58) Field of Classification Search .................... 717/168
 See application file for complete search history.

(56) References Cited

U.S. PATENT DOCUMENTS

| | | | |
|---|---|---|---|
| 7,512,724 B1 * | 3/2009 | Dennis et al. | 710/45 |
| 8,019,794 B2 * | 9/2011 | Pathak et al. | 707/803 |
| 2002/0002604 A1 | 1/2002 | Nomura | |
| 2005/0120106 A1 | 6/2005 | Albertao | |
| 2005/0278518 A1 | 12/2005 | Ko | |
| 2007/0236734 A1 | 10/2007 | Okamoto | |
| 2008/0056234 A1 * | 3/2008 | Sprague | 370/352 |
| 2008/0130639 A1 | 6/2008 | Costa-Requena | |
| 2010/0061268 A1 * | 3/2010 | Nishio | 370/254 |

OTHER PUBLICATIONS

"Web Services Architecture" downloaded Aug. 20, 2008 < http://www.w3.org/TR/ws-arch/wsa.pdf > 98 pages.
Communication received in European application No. 09161883.5-2211 dated Aug. 11, 2009 (10 pages).
Beatty, J. et al., Web Services Dynamic Discovery (WS-Discovery) Apr. 2005 XP-002381311 (42 pages).
Box, D. et al., "Web Services Eventing (WS-Eventing)" Mar. 2006 XP-002486468 (24 pages).
Microsoft: "Devices Profile for Web Services" Feb. 2006 XP-002485806 (39 pages).
Microsoft: "Introducing Devices Profile for Web Services" 2007 XP-002485830 (10 pages).
Zeeb, E. et al., "Service-Oriented Architectures for Embedded Systems Using Devices Profile for Web Services" Mar. 2007 IEEE (8 pages).

* cited by examiner

Primary Examiner — Don Wong
Assistant Examiner — Deric Ortiz
(74) Attorney, Agent, or Firm — Hickman Palermo Truong Becker Bingham Wong LLP; Daniel D. Ledesma (57) ABSTRACT

Techniques are provided for updating software components on an multi-function peripheral (MFP) using Web Services (WS). An MFP sends a multi-cast discovery message that conforms to a WS-Discovery protocol. An update server receives the discovery message and responds with a discovery response message that also conforms to a WS-Discovery protocol. The MFP sends, to the update server, an event subscription message that conforms to a WS-Eventing protocol. The event subscription message indicates one or more software components for which the MFP seeks an update. When an applicable update of a subscribed-for software component is available, the update server sends, to the MFP, an event notification message that conforms to a WS-Eventing protocol. In response to a message that requests the updated component, the update server sends, to the MFP, the updated software component.

26 Claims, 6 Drawing Sheets

MFP SOFTWARE UPDATE USING WEB SERVICE

FIELD OF THE INVENTION

The present invention relates to updating multi-function peripherals (MFPs) using Web Services.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The World Wide Web ("WWW") is a global information space. Text documents, images, multimedia and many other items of information, referred to as resources, are identified by short, unique, global identifiers called Uniform Resource Identifiers ("URIs") so that each can be found, accessed and cross-referenced in the simplest possible way.

The World Wide Web Consortium ("W3C") is an international consortium that develops standards for the World Wide Web. The W3C defines a "web service" as a software system that is designed to support interoperable machine-to-machine interaction over a network. This definition encompasses many different systems, but in common usage, the term refers to those services that use SOAP-formatted Extensible Markup Language ("XML") envelopes and that have their interfaces described using Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks.

The specifications that define web services are intentionally modular, and, as a result, there is no one document that defines all web services. Instead, there are a few core specifications that are supplemented by other specifications as the circumstances and choice of technology dictate. Common core specifications are SOAP, WSDL, WS-Security, and WS-ReliableExchange. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example.

WSDL is an XML format that allows web service interfaces to be described along with the details of those interfaces' bindings to specific protocols. WSDL is typically used to generate server and client code, and for configuration.

MFP

A multi-function peripheral (MFP) is a device that provides multiple services, such as a print service, a fax service, a scan service, a copy service, and an archive service. Thus, if an MFP includes a print server, then the MFP includes a printing module that is configured to process print data and cause a printed version of an electronic document reflected in the print data to be printed on a tangible medium, such as paper. The printing module may be implemented as computer hardware, compute software, or any combination of computer hardware and computer software.

Software components on MFPs occasionally need to be updated. However, there are numerous undesirable features of performing such updates. First, updating software components on an MFP typically requires several manual steps. Second, MPFs typically have to be taken offline in order to for the updated software components to take effect. Third, if an MFP includes an automatic update software for receiving updates, such software uses a fixed, pre-defined update server. Fourth, if an MFP includes automatic update software, an update client on an MFP and an update server that sends the updates are typically coupled based on a specific software type, on a specific operating system platform, and/or a specific language. For example, updates to different types of software require different update agents on the MFP and different servers.

SUMMARY

Techniques are provided for updating software components on an MFP using Web Services. The MFP sends a multi-cast discovery message that conforms to the WS-Discovery protocol. In response to receiving the discovery message from the MFP, the update server generates and sends, to the MPF, a discovery response message that conforms to the WS-Discovery protocol. In response to receiving the discovery response message, the MFP sends, to the update server, an event subscription message that conforms to a WS-Eventing protocol. The event subscription message indicates that the update server is to notify the MFP when the update server receives an updated version of a particular software component on the MFP.

The update server subsequently sends, to the MFP, an event notification message that conforms to the WS-Eventing protocol. The event notification message indicates that the update server has received an updated version of the particular software component. In response to receiving the event notification message, the MFP sends, to the update server, a request for the updated version of the particular software component. In response to receiving the request, the update server sends the updated version of the particular software component to the MFP. The MFP updates the current version of the particular software component with the updated version of the particular software component.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An MFP uses Web Services to discover update servers and register (or subscribe) for updates to certain software components on the MFP. The MFP generates and sends a multi-cast discovery message that conforms to a WS-Discovery protocol and that indicates one or more software types. An update server receives the discovery message and sends a discovery response message to the MFP if the update server supports software of at least one of the one or more software types. The MFP registers for one or more updates by sending, to the update server, an event subscription message that conforms to a WS-Eventing protocol. When an application update is available, the update server informs the MFP with an event notification message that also conforms to a WS-Eventing protocol.

Even though the specifications that define the various WS protocols change from time to time, one device that implements one version of a WS protocol (e.g., WS-Discovery) may still be able to communicate with another device that implements a different version of the same WS protocol. Therefore, two devices that communicate with each other are not necessarily required to implement the same version of each (or even of any) of the WS protocols that the devices support. Although the following description refers to WS-Discovery and WS-Eventing as if there is a single protocol for each, embodiments of the invention are also applicable to multiple versions of each protocol.

Software Update System

Figure 1:
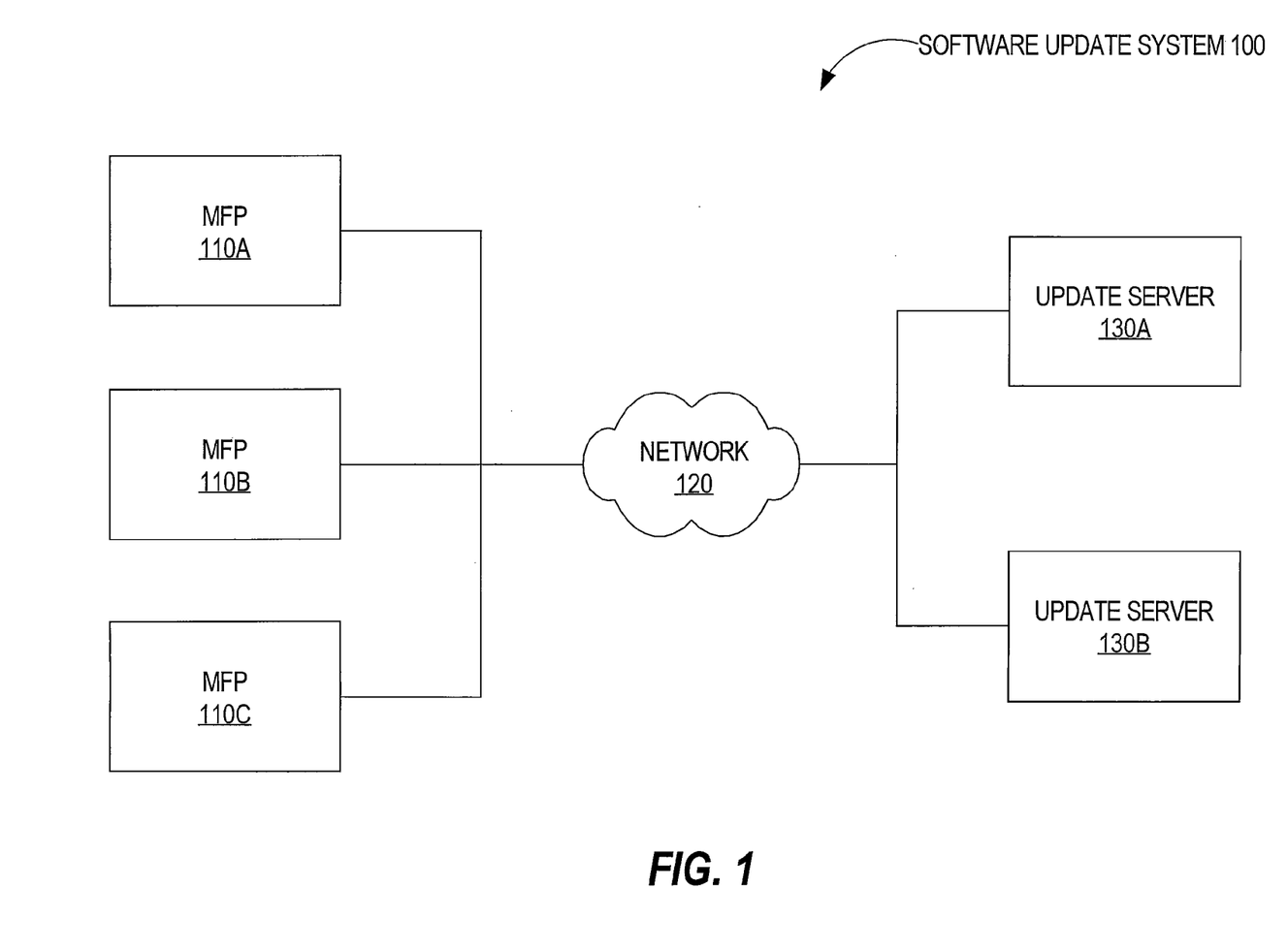
FIG. 1 is a diagram the depicts an example software update system, according to an embodiment of the invention.

FIG. 1 is a diagram that depicts an example software update system 100, according to an embodiment of the invention. Software update system 100 comprises MFPs 110A-C, network 120, and software update servers 130A-B. In a related embodiment, only a single MFP (e.g., 110A) and a single software update server (e.g., 130A) are communicatively coupled via network 120.

In an embodiment, one or more of MFPs 110A-C are WS-enabled devices. A WS-enabled device is a device that implements the Devices Profile for Web Services (DPWS) specification, which defines a minimal set of implementation constraints to enable secure Web Service messaging, discovery, description, and eventing on devices. DPWS builds on core Web Services standards, such as WSDL, XML Schema, SOAP, WS-Addressing, WS-MetadataExchange, WS-Transfer, WS-Policy, WS-Security, WS-Discovery, and WS-Eventing. The specification "Devices Profile for Web Services", February 2006, is incorporated by reference as if fully set forth herein.

MFPs 110A-C are communicatively coupled to update servers 130A-B via network 120. Network 120 may be implemented by any medium or mechanism that provides for the exchange of data between MFPs 110A-C and update servers 130A-B. Non-limiting examples of network 120 include a Local Area Network (LAN), a Wide Area Network (WAN), or the Internet.

One or more of update servers 130A-B may be network nodes, elements, and/or devices. Additionally or alternatively, one or more of update servers 130A-B may be implemented on network nodes, elements, and/or devices that provide other services. Non-limiting examples of such network nodes/elements/devices include web servers, gateways, routers, and switches.

Device Components in a Software Update System

Figure 2:
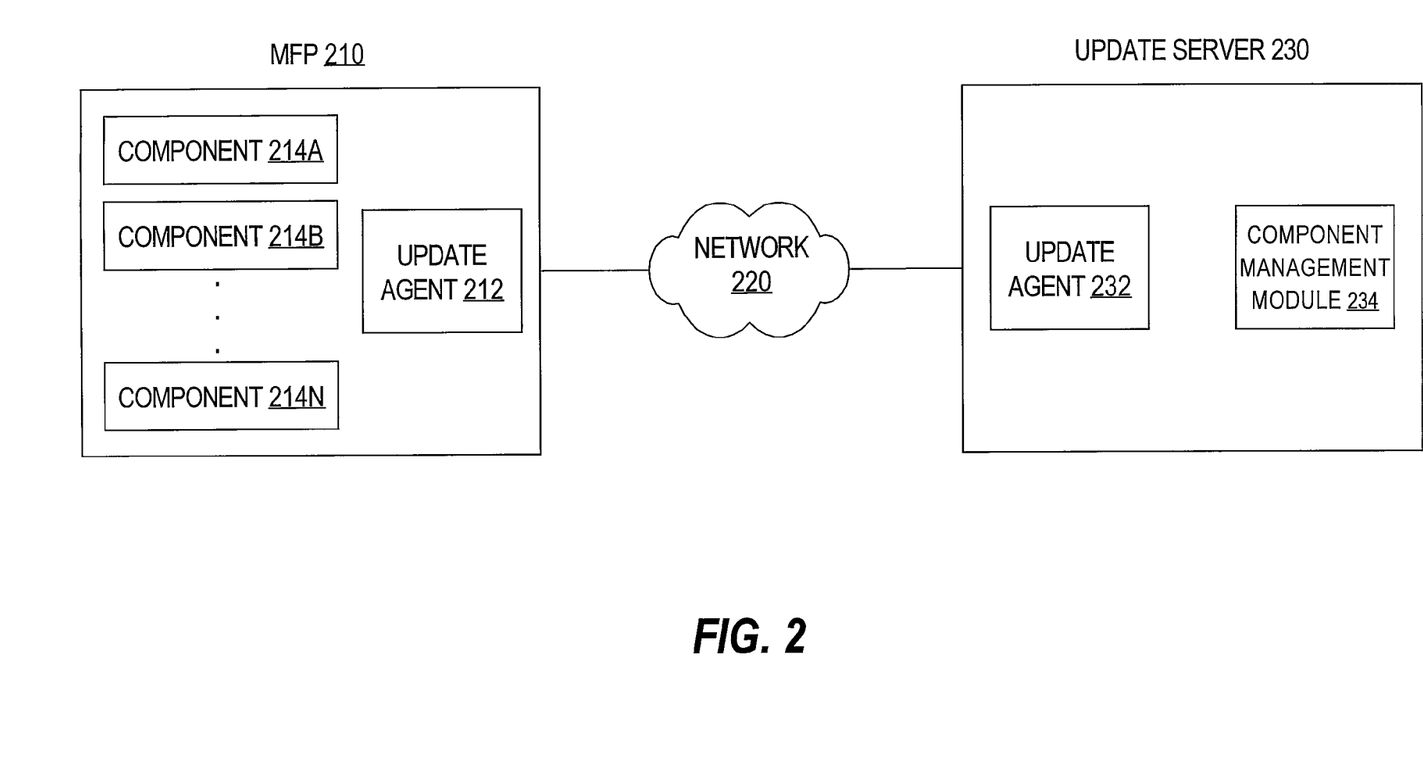
FIG. 2 is a block diagram that depicts different components of devices depicted in the example software update system, according to an embodiment of the invention.

FIG. 2 is a block diagram that depicts different components of devices depicted in software update system 100, according to an embodiment of the invention. An MFP 210 is communicatively coupled to an update server 230 via a network 220. MFP 210 may correspond to MFP 110A, update server 230 may correspond to update server 130A, and network 220 may correspond to network 120.

MFP 210 comprises an MFP update agent 212 and multiple MFP components 214A-C. In an embodiment, MFP update agent 212 is responsible for (a) discovering an appropriate update server, (b) subscribing for event notifications when an appropriate update server receives certain updates, (c) listening for event notifications, (d) requesting updates pertaining to received event notifications, (e) stopping and updating one or more of MFP components 214A-C that pertain to those updates, and (f) restarting the updated components.

Non-limiting examples of MFP components 214A-C include a set of one or more modules for each of the services (e.g., printing, scanning) provided by MFP 210, a Device Facility Manager (DFM) that represents the MFP as a single entity to other network devices, a graphical user interface (GUI) operational panel presented to a user, and network interfaces.

Update server 230 comprises server update agent 232 and component management module 234. In an embodiment, server update agent 232 is a process that is responsible for (a) sending discovery messages (e.g., HELLO or BYE) when server update agent 232 starts or stops, (b) responding to discovery message(s) from MFP update agent 212, (c) listening for and processing event subscriptions from MFP update agent 212, (d) notifying MFP update agent 212 when a software component update associated with one of the event subscriptions is received, and (e) responding to requests, from MFP update agent 212, for updated software components.

In an embodiment, component management module 234 stores updates to multiple software components and responds to (or affirmatively informs) server update agent 232 when module 234 receives another version (or a new version) of a software component.

Update agents 212 and 232 may be implemented as computer hardware, computer software, or any combination of computer hardware and computer software.

Communication Between an MFP and an Update Server

Figure 3:
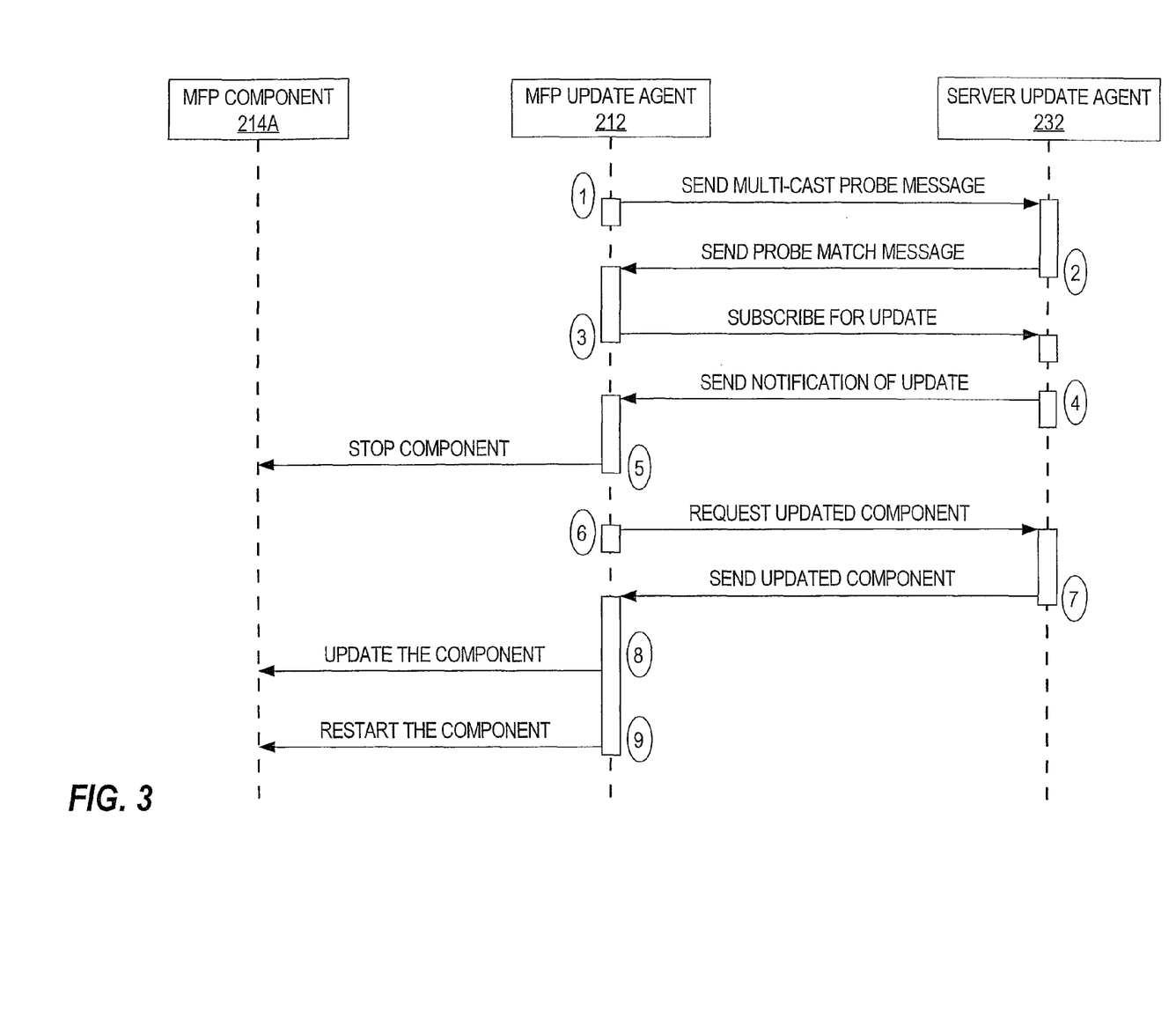
FIG. 3 is a sequence diagram that depicts a set of example communications between a MFP and an update server to update a software component on the MFP, according to an embodiment of the invention.

FIG. 3 is a sequence diagram that depicts a set of example communications between a MFP and an update server to update a software component on the MFP, according to an embodiment of the invention. For ease of discussion, the processes and/or components that are communicating with each other are MFP update agent 212 and MFP component 214A on MFP 210 and server update agent 232 on update server 230 of FIG. 2.

At step 1, MFP update agent 212 generates and sends, to server update agent 232, a discovery message that conforms to the WS-Discovery protocol. Because MFP update agent 212 is not pre-configured to know the location (or identity) of an available update server, the discovery message is a multicast message. Because the discovery message may be viewed as a network probe for available update servers that maintain updates applicable to MFP 210, the discovery message is referred to herein as a "probe message."

In an embodiment, the probe message specifies one or more software types. Each of the one or more software types corresponds to one or more software components for which server update agent 232 is seeking updates. For example, a probe message might indicate "WS protocols" as a software type. The WS specifications that an MFP implements may change over time. In order to "stay current" with respect to the WS specifications, the MFP should have its WS implementations updated accordingly. If new versions of one or more specific WS protocols are available, then server update agent 232 will send one or more event notification to MFP update agent 212 indicating such.

As another example, a probe message might indicate "MFP services" as a software type. The manufacturer of an MFP may update the features of one or more services (e.g., printing, scanning) provided by the MFP. The update may be to fix bugs in an archiving service, to add options (e.g., additional print sizes) available to print jobs, etc. Therefore, based on these two examples, update server 230 may maintain (e.g., store and/or send) updates for multiple types of software components.

In a related embodiment, the probe message directly specifies one or more of MFP components 214A-C rather than specifying a category of components via a software type.

At step 2, server update agent 232, in response to the probe message, sends a discovery response message (referred to herein as a "probe match message") that also conforms to the WS-Discovery protocol. In an embodiment, the probe message indicates (e.g., specifies) one or more software types. Thus, the probe match message indicates whether update server 230 maintains software components that correspond to the one or more software types. In this example sequence, the probe match message indicates that update server 230 maintains software components that correspond to at least one of the one or more software types indicated in the probe message. Alternatively, if update server 230 does not maintain software components that correspond to any of the indicated one or more software types, then server update agent 232 does not send any response to MFP 210.

At step 3, in response to an affirmative probe match message, MFP update agent 212 generates and sends, to server update agent 232, one or more event subscription messages that conform to the WS-Eventing protocol. An event subscription message specifies one or more software types for which MFP update agent 212 is seeking an update. The specification of the software type indirectly indicates the one or more software components that belong to that software type. Additionally or alternatively, an event subscription message specifies one or more software components for which MFP update agent 212 would like to receive updates.

Server update agent 232 may store the event subscriptions in a subscriber table. Table 1 is an example of a subscriber table:

TABLE 1

| MFP | COMPONENT TYPE | NOTIFY IP |
|---|---|---|
| 172.30.4.118 | DFM, WS_printer | 172.30.4.118:53000 |
| 172.30.4.114 | DFM, WS_printer | 172.30.4.114:2626 |
| 172.30.4.120 | NCS | 172.30.4.120:7070 |

Each row in Table 1 corresponds to a different subscription. The first column of Table 1 stores an address of the MFP that sent the corresponding subscription. The second column stores one or more types of components for which the corresponding subscription is subscribed. The third column stores an address and port number to which an event notification is to be sent when the corresponding software components are available for download to the corresponding MFP.

Information in the first column represents IP information, of an MFP update agent, that server update agent 232 may contact later in certain cases, such as un-subscribe message. Based on WS-Eventing, an event subscription should include both "ReplyTo" and "NotifyTo" addresses. The IP information in the first column corresponds to the "ReplyTo" address. In many cases, the "ReplyTo" address uses a different port number than the "NotifyTo" address. In cases where there is more than one network card in an MFP, the IP addresses in the first and third column could be different.

At step 4, server update agent 232 determines that a new version of a software component that belongs to one of the subscribed-for software types is available. This software component is referred to herein as the "particular software component." In response to this determination, server update agent 232 sends an event notification to MFP update agent 212 and to any other MFP that subscribed for that event, as indicated in the subscriber table. The event notification indicates that an update to the particular software component is available for download. An event notification may include the version number of the updated software component and/or any other description of the update that may assist an MFP in determining whether to request the updated software component.

Server update agent 232 may become aware of an update when a component table is updated. Table 2 is an example of a component table:

TABLE 2

| COMPONENT | MODEL | VERSION | PATH |
|---|---|---|---|
| DFM | Aficio_3245C | 1.1.113 | \\edt2\aficio_3245\ |
| WS_printer | Aficio_3245C | 1.1.2 | \\edt2\aficio_3245\ |
| NCS | Aficio_3245C | 1.4 | \\edt2\aficio_3245\ |
| CS | Aficio_3245C | 1.1 | \\edt2\aficio_3245\ |

Each row in Table 2 stores information about a version of software component. The first column of Table 2 stores the name of the corresponding component. The second column stores the model name of the MFP that uses the corresponding component. The third column stores the version number of the corresponding component. The fourth column stores a path that identifies where the corresponding component is stored. The storage of the various software components may be local and/or remote with respect to update server 230.

In an embodiment, component management module 234 maintains a mapping (e.g., a table) that maps a single software type to one or more corresponding software components. This mapping is referred to herein as a Component-to-Type mapping. Thus, when an update to a specific software component is determined (e.g., using Table 2 above), an entry, in the Component-to-Type mapping, corresponding to the specific software component is located. Once the entry is located, the entry is used to identify the corresponding software type. Then, Table 1 is used to determine, from the identified software type, one or more event subscriptions that pertain to the identified software type.

Although not depicted in FIG. 3, MFP update agent 212 may analyze, in response to receiving the event notification, one or more update criteria to determine whether to request the update. For example, the event notification may indicate the version number of the update of the particular software component. MFP update agent 212 may compare the version number of the current version of the particular software component with the version number of the update. If the version number of the update is not greater than the version number of the current version, then MFP update agent 212 may determine not to proceed with steps 5-9.

As another example, the event notification may indicate the model number of the MFP device that corresponds to the updated software component. MFP update agent 212 may determine whether that model number is the same as the model number of MFP 210. If not, then MFP update agent 212 may determine not to proceed with steps 5-9.

At step 5, in response to the event notification, MFP update agent 212 causes the particular software component to cease executing. In an embodiment, none of the other software components executing on MFP 210 are affected by this instruction. For example, if the update is for a printing module of MFP 210, then only the printing module is stopped. Other modules, such as a scanning module and a faxing module, may continue to function while the printing service provided by the printing module is down.

At step 6, MFP update agent 212 sends, to server update agent 232, a request for an updated version of the particular software component.

At step 7, in response to the request, server update agent 232 sends the updated version of the particular software component to MFP update agent 212. In a related embodiment, steps 6-7 are performed before step 5.

At step 8, MFP update agent 212 causes the particular software component to be updated with the updated version.

At step 9, MFP update agent 212 causes the particular component to be restarted based on the updated version.

Unavailability of an Update Server

According to an embodiment of the invention, an update server may become unavailable. The unavailability may be due to, e.g., a planned shut down, an unexpected power outage, or a loss of a network connection. If an update server "anticipates" going offline temporarily (or even permanently), then the update server may send an unsubscribe message (that conforms to the WS-Eventing protocol) to each of the MFPs that has subscribed for an event notification at the update server. Such MFPs are referred to herein as "registered MFPs" with respect to the update server. The unsubscribe message effectively ends the subscriptions between the registered MFPs and the update server. In order to receive updates, the registered MFPs discover one or more other update servers and subscribe for event notifications from those update servers.

Alternatively, an update server may, prior to becoming unavailable, transfer its component management duties to another update server. For example, a first update server may copy its subscriber and component tables to a second update server. The second update server may then act as the first update server with the same or different network (e.g., IP) address as the first update server. In an embodiment, the first and second update servers are part of a cluster of update servers that share the same logical network address. The multiple update servers may reside at a single network node, element, or device, or may reside at separate network nodes, elements, or devices, depending upon a particular implementation.

If the unavailability of an update server is unplanned or if the update server fails to send unsubscribe messages to each of its registered MFPs when the update server becomes unavailable, then each of the registered MFPs may send out another probe message in order to discover another update server. Registered MFPs may discover the unavailability of an update server in multiple ways. For example, a registered MFP may discover the unavailability of an update server when a network ping message that is periodically sent to the update server is not returned after a period of time. As another example, a registered MFP may set an expiration time in one or more of its events subscriptions with an update server. Then, upon expiration, the registered MFP attempts to renew the one or more event subscriptions with the update server. If the renew fails, then the failed renewal is used as at least one basis for determining that the update server is unavailable.

Alternatively, the subscriber and component tables may be stored on a device that is separate from an unavailable update server. Therefore, if an update server goes down unexpectedly, then the subscription information is not lost and may remain accessible to other update servers.

Implementing Multiple Threads for an MFP Update Agent

Figure 4:
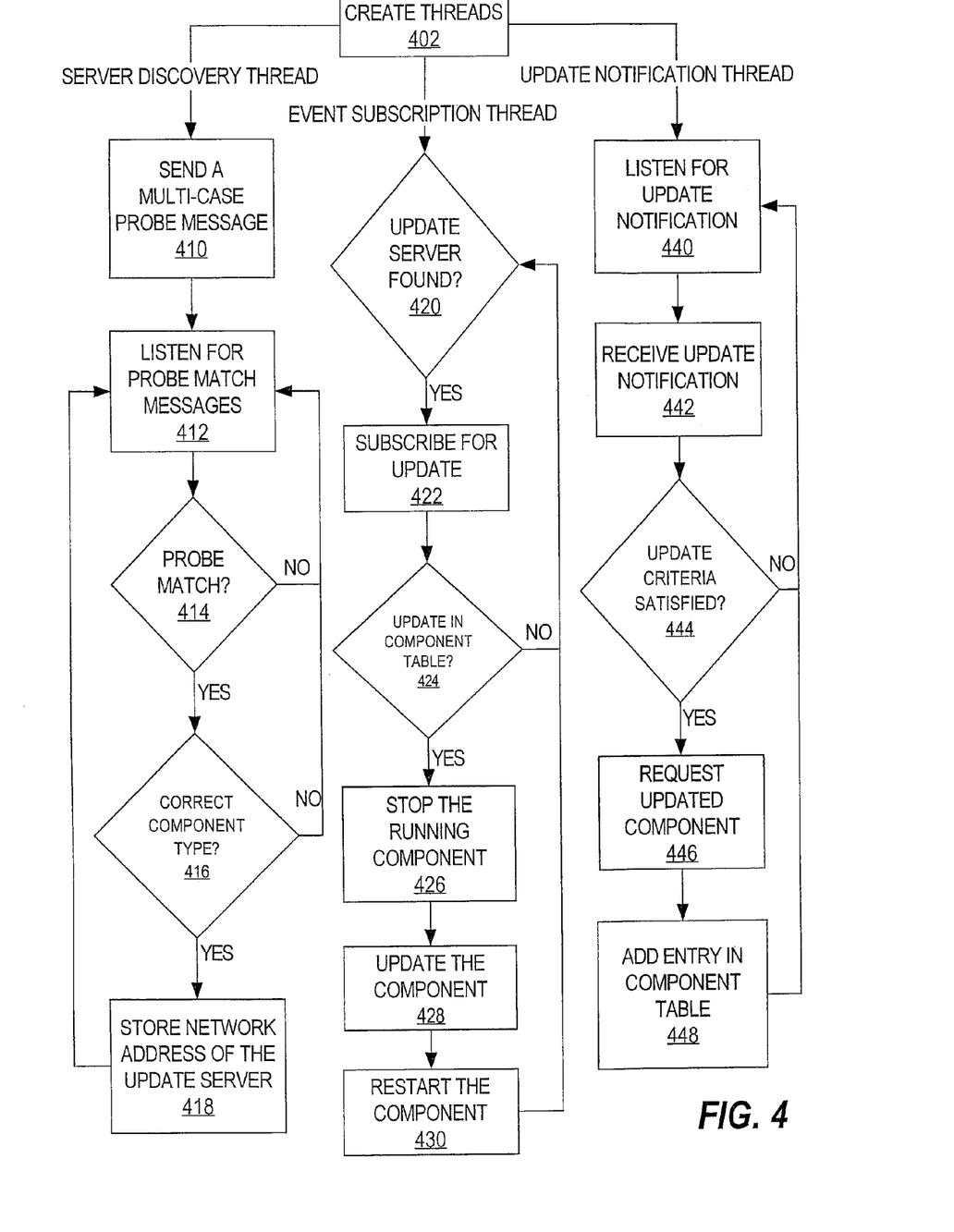
FIG. 4 is a flow diagram that illustrates multiple threads, of an MFP update agent, that perform various steps for updating the corresponding MFP, according to an embodiment of the invention.

FIG. 4 is a flow diagram that illustrates multiple threads, of an MFP update agent, that perform various steps for updating the corresponding MFP, according to an embodiment of the invention. At step 402, three threads are created. However, an MFP update agent may be implemented by more or less threads for performing the various steps. Steps 410-418 are performed by a server discovery thread. Steps 420-430 are performed by an event subscription thread. Steps 440-448 are performed by an update notification thread.

At step 410, the server discovery thread sends a probe message. At step 412, the server discovery thread listens for probe match messages. Step 412 may also comprise listening for a HELLO message that an update server sends when, e.g., the update server powers on or is connected to the network for the first time. The HELLO message may include the same information as a probe match message, such as the software type(s) supported by the update server.

At step 414, in response to receiving a message, the server discovery thread determines whether the message is a probe match message. If so, then, at step 416, the server discovery thread determines whether the probe match message indicates applicable software components types. If so, then, at step 418, the server discovery thread stores the IP address of the update server that sent the probe match message.

At step 420, the event subscription thread determines whether an update server has been discovered. If so, then, at step 422, the event subscription thread sends an event subscription message to the update server that was discovered. At step 424, the event subscription thread checks a component table (i.e., on the MFP) for available updates. The component table is populated by the update notification thread, described below.

When an available update is found, the event subscription thread, at step 426, stops the running software component that corresponds to the available update. At step 428, the event subscription thread updates the software component with the available update. At step 430, the event subscription thread restarts the software component.

At step 440, the update notification thread listens for event notification messages from one or more update servers. At step 442, the update notification thread receives an event notification message from an update server for a particular software component. At step 444 the update notification thread determines whether one or more update criteria are satisfied. If not, then the process for the update notification thread proceeds to step 440.

If the one or more update criteria are satisfied, then, at step 446, the update notification thread sends a request to the update server for the particular software component. At step 448, the update notification thread receives the particular software component from the update server and adds an entry, for the particular software component, in the component table referenced in step 434.

Implementing Multiple Threads for a Server Update Agent

Figure 5:
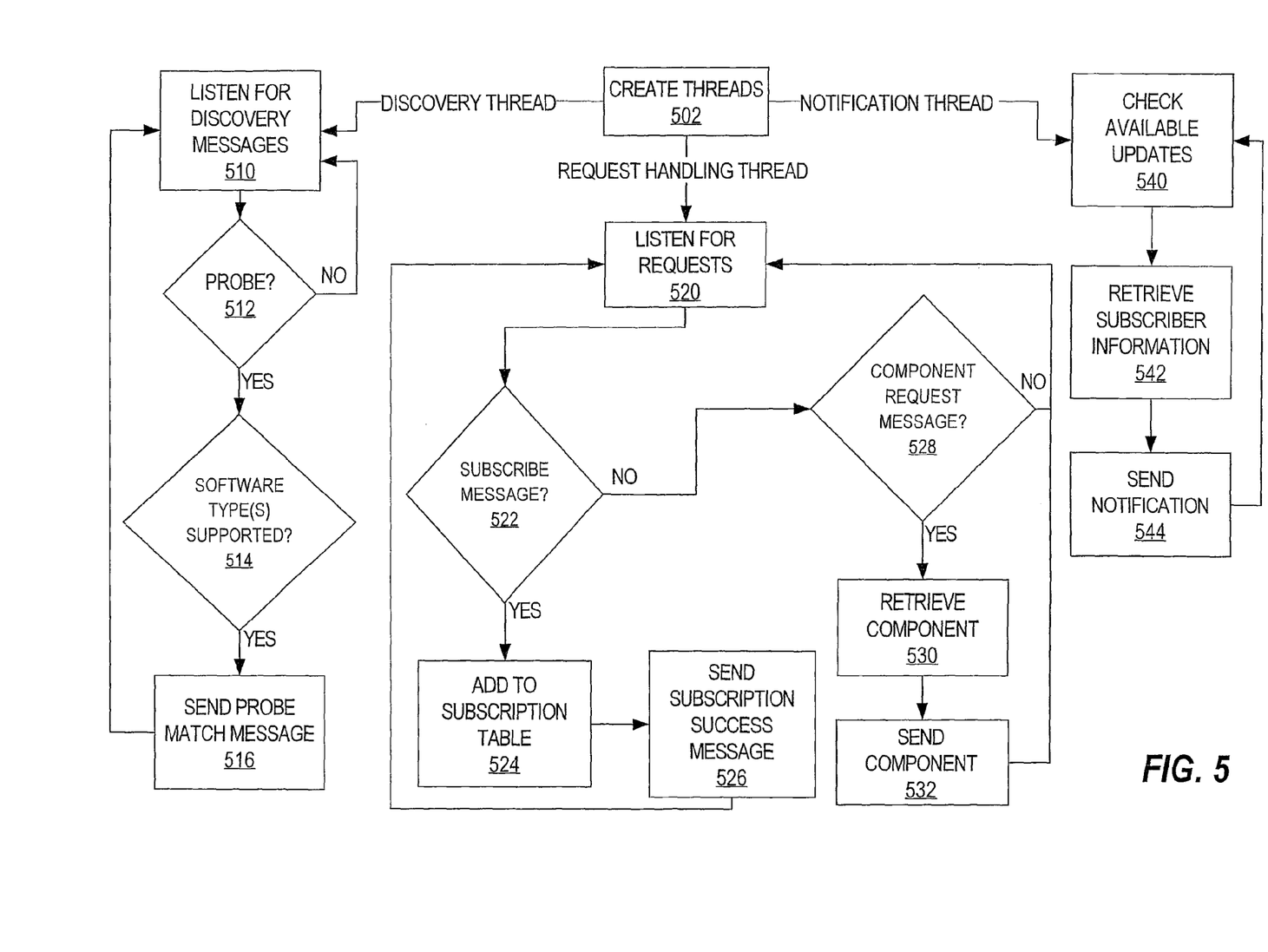
FIG. 5 is a flow diagram that illustrates multiple threads, of a server update agent, that perform various steps for updating an MFP, according to an embodiment of the invention.

FIG. 5 is a flow diagram that illustrates multiple threads, of a server update agent, that perform various steps for updating an MFP, according to an embodiment of the invention. At step 502, three threads are created. However, an MFP update agent may be implemented by more or less threads for performing the various steps. Step 502 may also comprise sending a HELLO message in the network, e.g., when the update server is powered on. Steps 510-516 are performed by a discovery thread. Steps 520-532 are performed by a request handling thread. Steps 540-544 are performed by a notification thread.

At step 510, the discovery thread listens for discovery messages. At step 512, the discovery thread determines whether a discovery message is a probe message. If so, then, at step 514, the discovery thread determines whether a software type indicated in the probe message is supported by the corresponding update server. In an embodiment, if the update server supports the software type, then the discovery thread sends, at step 516, a unicast probe match message to the sender of the probe message. If the update server does not support any of the indicated software types, then no probe match message is sent to the sender of the probe message.

At step 520, the request handling thread listens for request messages. A request message may be one of at least two types: an event subscription message or a software component message. If a request message is received, then the request handling thread, at step 522, determines whether the request message is an event subscription message. If so, then the event subscription message conforms to the WS-Eventing protocol. At step 524, the request handling thread adds the subscription to a subscriber table, such as Table 1. If step 524 is successful, then, at step 526, the request handling thread responds, according to the WS-Eventing protocol, to the sender of the event subscription message with a successful subscription message.

If, at step 522, the request handling thread determines that the request message is not an event subscription message, then, at step 528, the request handling thread determines whether the request message is a component request message. If so, then at step 530, the software component is retrieved from a component table, such as Table 2. At step 532, the request handling thread then sends the software component to the sender of the component request message.

At step 540, the notification thread checks for available updates of one or more software components. In an embodiment, the notification thread listens for messages, from a component management module (e.g., such as component management module 234), that indicate that a new update has been received and that the update pertains to one of the subscribed-for software components (a) identified in the component table or (b) that correspond to software types identified in the component table. At step 542, the notification thread retrieves information (e.g., from the component table) about the subscribers that correspond to available updates. At step 544, the notification thread sends an event notification message to each of those subscribers.

Implementation Mechanisms

Figure 6:
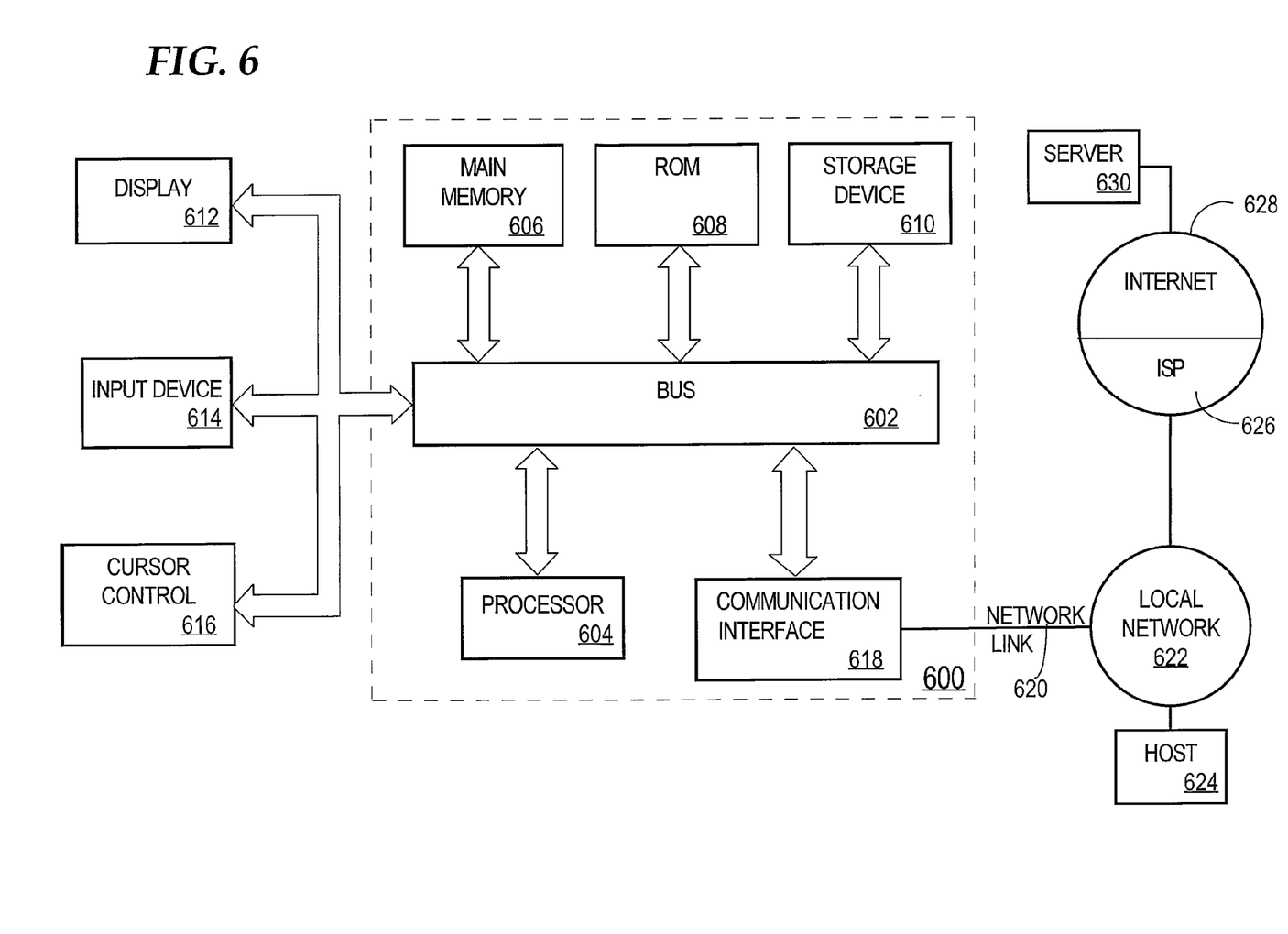
FIG. 6 is a block diagram that depicts a computer system upon which an embodiment of the invention may be implemented.

Embodiments of the invention may be implemented on any type of computing architecture or platform. For purposes of explanation, FIG. 6 is a block diagram that depicts a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A multi-function peripheral (MFP) comprising:

one or more software components that includes a current version of a particular software component;

a printing module that is configured to process print data and cause a printed version of an electronic document reflected in the print data to be printed on a tangible medium;

wherein the MFP is configured to perform the steps of:

the MFP sending a multi-cast discovery message that conforms to a Web Services- (WS-) Discovery protocol;

the MFP receiving, from an update server, a discovery response message that conforms to the WS-Discovery protocol and indicates that the update server is available to provide updates of one or more of the one or more software components that reside on the MFP;

in response to the MFP receiving the discovery response message, the MFP sending, to the update server, an event subscription message that conforms to a WS-Eventing protocol, wherein the event subscription message indicates that the MFP is to be notified by the update server when the update server receives an updated version of the particular software component;

the MFP receiving, from the update server, an event notification message that conforms to the WS-Eventing protocol, wherein the event notification message indicates that the update server has received an updated version of the particular software component;

in response to the MFP receiving the event notification message, the MFP sending, to the update server, a request for the updated version of the particular software component;

the MFP receiving, from the update server, the particular software component; and the MFP updating the current version of the particular software component with the updated version of the particular software component.

2. The MFP of claim 1, wherein:
the event subscription message specifies a particular software type; and
the particular software type corresponds to a plurality of different software components that includes the particular software component.

3. The MFP of claim 2, wherein the event subscription message also specifies a second software type that is different than the particular software type, wherein the MFP is further configured to perform the steps of:
receiving, from the update server, a second event notification message that conforms to the WS-Eventing protocol, wherein the second event notification message indicates that the update server has received an updated version of a second software component that belongs to the second software type;
in response to receiving the second event notification message, sending, from the MFP to the update server, a second request for the updated version of the second software component;
receiving, from the update server, the second software component; and
updating a current version of the second software component with the updated version of the second software component.

4. The MFP of claim 1, wherein the MFP is further configured to perform the steps of:
determining that the update server is unavailable;
in response to determining that the update server is unavailable, sending a second multi-cast discovery message that conforms to the WS-Discovery protocol;
receiving, from a second update server, a second discovery response message that conforms to the WS-Discovery protocol and indicates that the second update server is available to provide updates of one or more of the one or more software components;
in response to receiving the second discovery response message, sending, from the MFP to the second update server, a second event subscription message that conforms to the WS-Eventing protocol, wherein the second event subscription message indicates that the MFP is to be notified by the second update server when the second update server receives another updated version of the particular software component;
receiving, from the second update server, a second event notification message that conforms to the WS-Eventing protocol, wherein the second event notification message indicates that the second update server has received a second updated version of the particular software component;
in response to receiving the second event notification message, sending, from the MFP to the second update server, a request for the second updated version of the particular software component;
receiving, from the second update server, the second updated version of the particular software component; and
updating the current version of the particular software component with the second updated version of the particular software component.

5. The MFP of claim 1, wherein the MFP is further configured to perform the steps of:

in response to receiving the event notification, causing the current version of the particular software component on the MFP to cease executing; and
in response to updating the particular component, causing the updated version of the particular software component to begin executing.

6. The MFP of claim 1, wherein the MFP implements the set of WS specifications required by WS-Devices Profile.

7. The MFP of claim 1, wherein the MFP is further configured to perform the steps of:
creating, on the MFP, a first thread, a second thread, and a third thread, wherein:
the first thread receives discovery response messages,
the second thread sends event subscription messages, and
the third thread receives event notification messages and requests updated software components associated with the event notification messages.

8. A method of updating one or more software components on a multi-function peripheral (MFP) that includes a current version of a particular software component, the method comprising:
the MFP sending a multi-cast discovery message that conforms to a Web Services- (WS-) Discovery protocol, wherein the MFP includes a printing module that is configured to process print data and cause a printed version of an electronic document reflected in the print data to be printed on a tangible medium;
the MFP receiving, from an update server, a discovery response message that conforms to the WS-Discovery protocol and indicates that the update server is available to provide updates of one or more of the one or more software components that reside on the MFP;
in response to the MFP receiving the discovery response message, the MFP sending, to the update server, an event subscription message that conforms to a WS-Eventing protocol, wherein the event subscription message indicates that the MFP is to be notified by the update server when the update server receives an updated version of the particular software component;
the MFP receiving, from the update server, an event notification message that conforms to the WS-Eventing protocol, wherein the event notification message indicates that the update server has received an updated version of the particular software component;
in response to the MFP receiving the event notification message, the MFP sending, to the update server, a request for the updated version of the particular software component;
the MFP receiving, from the update server, the particular software component; and
the MFP updating the current version of the particular software component with the updated version of the particular software component.

9. The method of claim 8, wherein:
the event subscription message specifies a particular software type;
the particular software type corresponds to a plurality of different software components that includes the particular software component.

10. The method of claim 9, wherein the event subscription message also specifies a second software type that is different than the particular software type, the method further comprising:
receiving, from the update server, a second event notification message that conforms to the WS-Eventing protocol, wherein the second event notification message indicates that the update server has received an updated version of a second software component that belongs to the second software type;
in response to receiving the second event notification message, sending, from the MFP to the update server, a second request for the updated version of the second software component;
receiving, from the update server, the second software component; and
updating a current version of the second software component with the updated version of the second software component.

11. The method of claim 8, further comprising:
determining that the update server is unavailable;
in response to determining that the update server is unavailable, sending a second multi-cast discovery message that conforms to the WS-Discovery protocol;
receiving, from a second update server, a second discovery response message that conforms to the WS-Discovery protocol and indicates that the second update server is available to provide updates of one or more of the one or more software components;
in response to receiving the second discovery response message, sending, from the MFP to the second update server, a second event subscription message that conforms to the WS-Eventing protocol, wherein the second event subscription message indicates that the MFP is to be notified by the second update server when the second update server receives another updated version of the particular software component;
receiving, from the second update server, a second event notification message that conforms to the WS-Eventing protocol, wherein the second event notification message indicates that the second update server has received a second updated version of the particular software component;
in response to receiving the second event notification message, sending, from the MFP to the second update server, a request for the second updated version of the particular software component;
receiving, from the second update server, the second updated version of the particular software component; and
updating the current version of the particular software component with the second updated version of the particular software component.

12. The method of claim 8, further comprising:
in response to receiving the event notification, causing the current version of the particular software component on the MFP to cease executing; and
in response to updating the particular component, causing the updated version of the particular software component to begin executing.

13. The method of claim 8, wherein the MFP implements the set of WS specifications required by WS-Devices Profile.

14. The method of claim 8, further comprising:
creating, on the MFP, a first thread, a second thread, and a third thread, wherein:
the first thread receives discovery response messages,
the second thread sends event subscription messages, and
the third thread receives event notification messages and requests updated software components associated with the event notification messages.

15. A computer-readable storage medium storing instructions for updating one or more software components on a multi-function peripheral (MFP) that includes a current version of a particular software component, wherein the instructions, when executed by one or more processors, cause:
the MFP sending a multi-cast discovery message that conforms to a Web Services- (WS-) Discovery protocol, wherein the MFP includes a printing module that is configured to process print data and cause a printed version of an electronic document reflected in the print data to be printed on a tangible medium;
the MFP receiving, from an update server, a discovery response message that conforms to the WS-Discovery protocol and indicates that the update server is available to provide updates of one or more of the one or more software components that reside on the MFP;
in response to the MFP receiving the discovery response message, the MFP sending, to the update server, an event subscription message that conforms to a WS-Eventing protocol, wherein the event subscription message indicates that the MFP is to be notified by the update server when the update server receives an updated version of the particular software component;
the MFP receiving, from the update server, an event notification message that conforms to the WS-Eventing protocol, wherein the event notification message indicates that the update server has received an updated version of the particular software component;
in response to the MFP receiving the event notification message, the MFP sending, to the update server, a request for the updated version of the particular software component;
the MFP receiving, from the update server, the particular software component; and
the MFP updating the current version of the particular software component with the updated version of the particular software component.

16. The computer-readable storage medium of claim 15, wherein:
the event subscription message specifies a particular software type; and
the particular software type corresponds to a plurality of different software components that includes the particular software component.

17. The computer-readable storage medium of claim 16, wherein the event subscription message also specifies a second software type that is different than the particular software type, wherein the instructions include instructions which, when executed by the one or more processors, further cause:
receiving, from the update server, a second event notification message that conforms to the WS-Eventing protocol, wherein the second event notification message indicates that the update server has received an updated version of a second software component that belongs to the second software type;
in response to receiving the second event notification message, sending, from the MFP to the update server, a second request for the updated version of the second software component;
receiving, from the update server, the second software component; and
updating a current version of the second software component with the updated version of the second software component.

18. The computer-readable storage medium of claim 15, wherein the instructions include instructions which, when executed by the one or more processors, further cause:
determining that the update server is unavailable;

in response to determining that the update server is unavailable, sending a second multi-cast discovery message that conforms to the WS-Discovery protocol;

receiving, from a second update server, a second discovery response message that conforms to the WS-Discovery protocol and indicates that the second update server is available to provide updates of one or more of the one or more software components;

in response to receiving the second discovery response message, sending, from the MFP to the second update server, a second event subscription message that conforms to the WS-Eventing protocol, wherein the second event subscription message indicates that the MFP is to be notified by the second update server when the second update server receives another updated version of the particular software component;

receiving, from the second update server, a second event notification message that conforms to the WS-Eventing protocol, wherein the second event notification message indicates that the second update server has received a second updated version of the particular software component;

in response to receiving the second event notification message, sending, from the MFP to the second update server, a request for the second updated version of the particular software component;

receiving, from the second update server, the second updated version of the particular software component; and updating the current version of the particular software component with the second updated version of the particular software component.

19. The computer-readable storage medium of claim 15, wherein the instructions include instructions which, when executed by the one or more processors, further cause:

in response to receiving the event notification, causing the current version of the particular software component on the MFP to cease executing; and in response to updating the particular component, causing the updated version of the particular software component to begin executing.

20. The computer-readable storage medium of claim 15, wherein the MFP implements the set of WS specifications required by WS-Devices Profile.

21. The computer-readable storage medium of claim 15, wherein the instructions include instructions which, when executed by the one or more processors, further cause:

creating, on the MFP, a first thread, a second thread, and a third thread, wherein:
the first thread receives discovery response messages,
the second thread sends event subscription messages, and
the third thread receives event notification messages and requests updated software components associated with the event notification messages.

22. A network device for updating one or more software components on a multi-function peripheral (MFP) that includes a current version of a particular software component, wherein the network device is configured to perform the steps of:

the network device receiving, from the MFP, a multi-cast discovery message that conforms to a Web Services-(WS-) Discovery protocol, wherein the MFP includes a printing module that is configured to process print data and cause a printed version of an electronic document reflected in the print data to be printed on a tangible medium;

in response to the network device receiving the discovery message, the network device sending, to the MFP, a discovery response message that conforms to the WS-Discovery protocol and indicates that the network device is available to provide updates of one or more of the one or more software components that reside on the MFP;

the network device receiving, from the MFP, an event subscription message that conforms to a WS-Eventing protocol, wherein the event subscription message indicates that the network device is to notify the MFP when the network device receives an updated version of the particular software component;

in response to the network device receiving an updated version of the particular software component, the network device sending, to the MFP, an event notification message that conforms to the WS-Eventing protocol, wherein the event notification message indicates that the network device has received an updated version of the particular software component;

the network device receiving, from the MFP, a request for the updated version of the particular software component; and the network device sending, to the MFP, the updated version of the particular software component.

23. The network device of claim 22, wherein:
the event subscription message specifies a particular software type; and
the particular software type corresponds to a plurality of different software components that includes the particular software component.

24. The network device of claim 23, wherein the event subscription message also specifies a second software type that is different than the particular software type, wherein the network device is further configured to perform the steps of:

sending, to the MFP, a second event notification message that conforms to the WS-Eventing protocol, wherein the second event subscription message indicates that the update server has received an updated version of a second software component that belongs to the second software type;

receiving, from the MFP, a second request for the updated version of the second software component and;

in response to receiving the second request, sending, to the MFP, the second software component.

25. The network device of claim 22, wherein the network device is further configured to perform the steps of:
determining that the update server will be unavailable to send event notifications to any MFPs; and
causing a second update server to maintain event subscription information related to the event subscription message.

26. The network device of claim 22, wherein the network device is further configured to perform the step of creating a first thread, a second thread, and a third thread, wherein:
the first thread receives discovery messages,
the second thread receives event subscription messages, and
the third thread receives updates to a plurality of software components and sends event notification messages in response to the updates.

* * * * *